United States Patent [19]
McCloskey

[11] 3,901,567
[45] *Aug. 26, 1975

[54] ANTI-FRICTION BALL BEARING ASSEMBLY

[75] Inventor: Albert R. McCloskey, Fairfield, Conn.

[73] Assignee: Rockwell International Corporation, Pittsburgh, Pa.

[ * ] Notice: The portion of the term of this patent subsequent to Jan. 29, 1991, has been disclaimed.

[22] Filed: Feb. 22, 1973

[21] Appl. No.: 334,706

[52] U.S. Cl. ............................. 308/6 C
[51] Int. Cl. ........................... F16c 17/00
[58] Field of Search ...................... 308/6 C

[56] References Cited
UNITED STATES PATENTS
3,788,708   1/1974   McCloskey .................. 308/6 C Primary Examiner—Charles J. Myhre
Assistant Examiner—R. H. Lazarus

[57] ABSTRACT

An anti-friction ball bearing assembly adapted for mounting on a shaft comprising an outer sleeve and an inner sleeve concentrically fitting within said outer sleeve, having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, a smooth transition portion that presents no abrupt changes in direction for said balls contiguous with the ends of said raceway surfaces to enable said balls to smoothly begin or end said portion of their circulation path in which said balls are in contact with said shaft and raceway surfaces.

1 Claim, 2 Drawing Figures

ANTI-FRICTION BALL BEARING ASSEMBLY

BACKGROUND OF THE INVENTION

This invention relates to a ball bearing assembly adapted to move longitudinally along a circular shaft. In particular, the invention relates to an anti-friction ball bearing assembly adapted for mounting on a shaft comprising an outer sleeve and an inner sleeve concentrically fitting within said outer sleeve, having a number of tracks defining paths for the circulation of balls between said sleeves and said shaft during movement between said shaft and said bearing assembly, said balls during a portion of their circulation path, contacting said shaft and the inner surface of said outer sleeve at a plurality of raceway surfaces provided thereon, a smooth transition portion that presents no abrupt changes in direction for said balls contiguous with the ends of said raceway surfaces to enable said balls to smoothly begin or end said portion of their circulation path in which said balls are in contact with said shaft and raceway surfaces.

The prior art is replete with recirculating ball bearing assemblies. Typical prior art forms of bearings of this type are subject to high rates of wear between their respective parts. Additionally, they are intricate in design and expensive to manufacture. Premature wear may, for example, occur when the balls of the anti-friction ball bearing assembly encounter in their circulation path abrupt changes in direction. such an abrupt change in direction is typically caused at that point at which the balls begin and end the portion of their circulation path during which they are in contact with the shaft and the raceway surfaces provided on the inner surface of the outer sleeve of the ball bearing assembly. It has been determined that material fatigue will occur generally at the ends of various raceway surfaces provided on the inner surface of the outer sleeve. This fatigue will cause ultimate failure of the bearing assembly as well as scoring of the shaft upon which it moves longitudinally. This, of course, could result in expensive down time of the machine or apparatus which with the bearing assembly is associated and additionally possible replacement of not only the ball bearing assembly but its associated shaft.

SUMMARY OF THE INVENTION

Accordingly, it is a primary object of this invention to provide an anti-friction ball bearing assembly adapted for mounting on a shaft comprising an outer sleeve and an inner sleeve concentrically fitting within said outer sleeve, having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, a smooth transition portion that presents no abrupt changes in direction for said balls contiguous with the ends of said raceway surfaces to enable said balls to smoothly begin or end said portion of their circulation path in which said balls are in contact with said shaft and raceway surfaces.

It is another object of this invention to provide an anti-friction ball bearing assembly in which the transition portion between the raceway surfaces which ramps the balls into and out of their "active" position is defined by a curve substantially tangent to the raceway surface and blended into a recess provided at each end of the inner surface of the outer sleeve.

It is yet another object of the present invention to provide a highly efficient ball bearing assembly which is capable of being inexpensively manufactured and being simplistic in design.

It is still another object of the present invention to provide an anti-friction ball bearing assembly which can be manufactured using automated high volume techniques.

Other objects of the present invention and details of the structure of the anti-friction ball bearing assembly will appear more fully from the following description and accompanying drawings.

Figure 1:
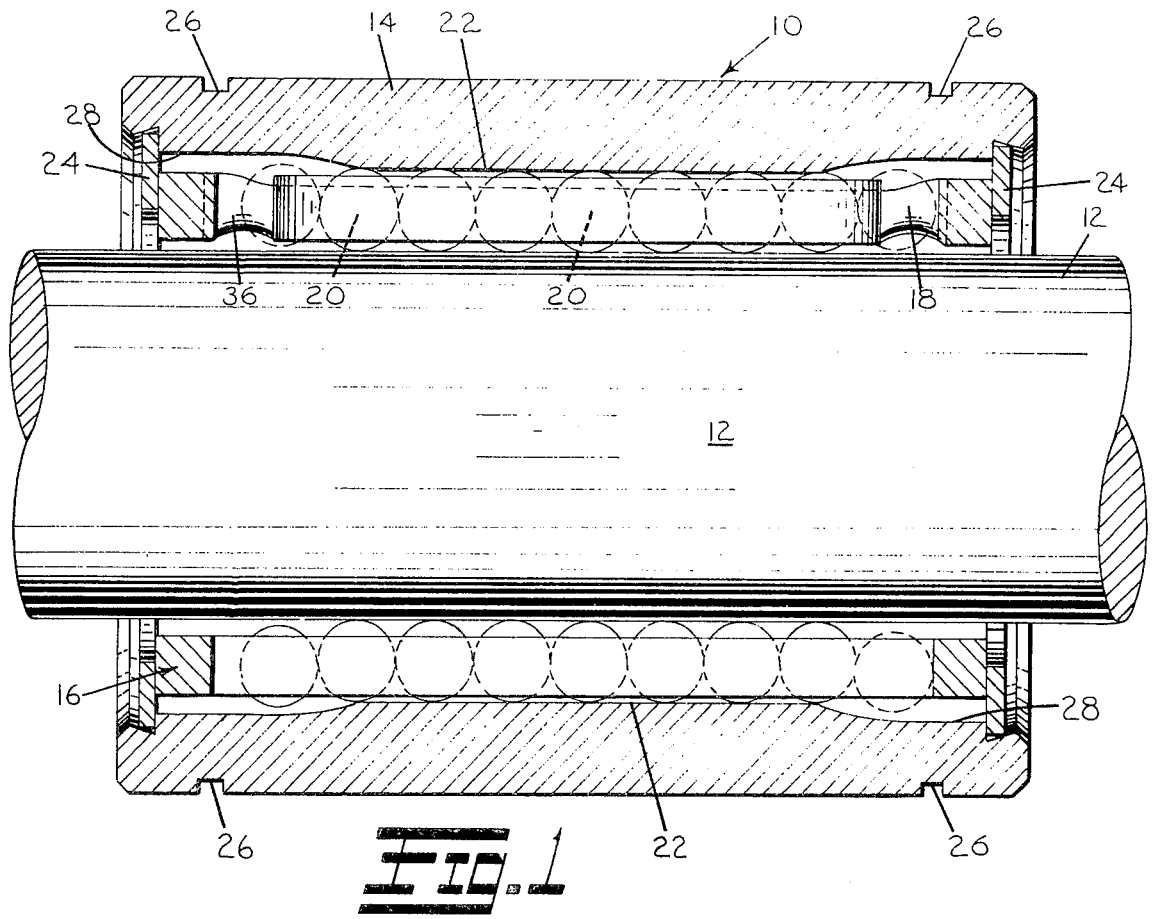
FIG. 1 is a side elevational view partially cut away of an anti-friction ball bearing assembly mounted on a shaft embodying the concept of the present invention.
Figure 2:
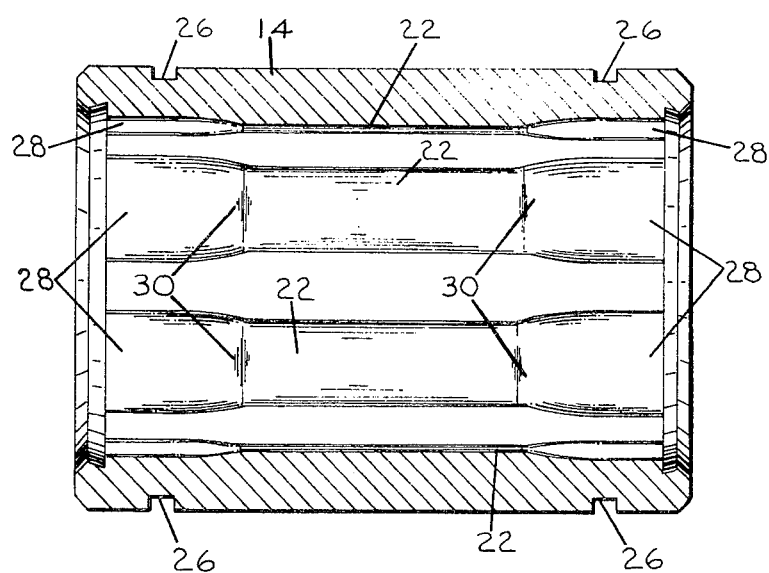
FIG. 2 is a sectional view of the outer sleeve of the anti-friction ball bearing assembly in FIG. 1.

Referring now to the drawings and in particular FIGS. 1 and 2, there is shown an improved anti-friction ball bearing assembly embodying the concept of the present invention wherein the anti-friction ball bearing assembly is generally designated by the numeral 10. The anti-friction ball bearing assembly is particularly adapted for being mounted, for linear translation, on a shaft 12. The anti-friction ball bearing assembly 10 is provided with an outer sleeve 14 and an inner sleeve 16. The inner sleeve 16 is concentrically interfitted within the outer sleeve 14. The outer surface of the inner sleeve 16 may be polyhedronal in shape and may have a number of axially extending planar surfaces (not shown).

The inner sleeve 16 is further provided with a number of closed loop tracks 18 which define paths with circulation of load carrying balls 20. The inner surface of the outer sleeve 14 may also be polyhedronal in shape. The inner surface of the outer sleeve 14 has a number of axially extending planar surfaces. The shape of the inner surface of the outer sleeve 14 generally conforms to the shape of the outer surface of the inner sleeve 16. The outer surface of the inner sleeve 16 therefore may be placed in registration with the inner surface of the outer sleeve at their respective axially extending planar surfaces.

A plurality of axially extending bearing raceways 22 are provided on the inner surface of the outer sleeve 14.

The retaining means such as snap rings 24 are provided at each end of the anti-friction ball bearing assembly 10 to positionally anchor the inner sleeve 16 in the outer sleeve 14 to thereby maintain the operational integrity of the anti-friction ball bearing assembly 10. The snap rings 24 therefore maintain the axial portion of the inner sleeve 16 with respect to the outer sleeve 14 while the aforementioned registration of the axially extending planar surfaces of the inner sleeve 16 and the outer sleeve 14 maintain the radial position of the inner sleeve 16 with respect to the outer sleeve 14.

The outer surface of the outer sleeve may be substantially cylindrical in shape and may be provided with annular grooves 26. The grooves 26 may be adapted to receive retaining means such as snap rings (not shown) to positionally anchor or attach the anti-friction ball bearing assembly 10 within or to a bushing or other like housing member, (also not shown).

The above description in general described an anti-friction ball bearing assembly generally in accordance with my previous invention as disclosed in U.S. Pat. application No. 271,776 filed in the U.S. Patent Office on July 14, 1972, and now U.S. Pat. No. 3,788,708.

The improvement which is the subject of this invention is to be found primarily in the structure of the outer sleeve 14 and in particular in the inner surface of said outer sleeve 14. As before noted and as can be best seen in FIG. 2, the inner surface of the outer sleeve 14 is provided with a plurality of axially extending raceway surfaces 22. These surfaces provide the bearing support for the balls 20 while they are in the "active" position. The active position may be defined as that portion of the circulation path of the balls 20 in which they are in operational contact with both the raceway surfaces 22 and the outer surface of the shaft 12. As also can be seen in FIG. 2, the inner surface of the outer sleeve is provided with recesses 28 at each end of the inner surface of the outer sleeve 14. These recesses 28 enable the balls to circulate from and to their active position. That is, the balls 20 begin or end their passive position when they are transversing the recesses 28. The passive position of the balls 20 may be defined as that portion of their circulating path when they are not in contact with the outer surface of the shaft 12 and the axially extending raceways 22. As before mentioned, it is extremely important that the balls 20 make a smooth transition from their active to passive positions and vice versa. Accordingly, a transition portion 30 is provided between the recesses 28 and the axially extending raceway 22 to provide for such a smooth transition for the circulating balls. It is critical that the transition portions present no abrupt changes in direction for the balls as they move from or to their active position. Accordingly, the smooth transition may be defined by a curve which is tangent with the raceway surface and blended with the recesses 28. A number of manufacturing methods can be employed to achieve the smooth transition portion 30. One such method might employ the use of a soft rotating tapered lapping tool to smooth and form the transition portion 30. The lapping tool (which is not shown) may include abrasive impregnated wood or abrasive or impregnated leather or plastic or other such suitable abrasive products. Another approach to generating the smooth transition portion 30 may utilize a suitably sized soft rope material impregnated with abrasive (not shown). The so impregnated soft rope material could be forced through the inner surface of the outer sleeve 14 and oscillated with respect thereto. The tight fitting abrasive material would hone the raceway surfaces 22 and simultaneously blend the edges of the raceway surfaces to generate the smooth transition portion 30. Yet another approach to generate the smooth transition portion 30 could employ or utilize a suitable formed wheel or an internal grinder. It is important to note that the various manufacturing processes or methods utilized to generate the smooth transition portion 30 be controlled such that there are no resulting ridges or small variations in the transition portion 30 remaining at the end of such process. This can typically occur if the smooth transition portion 30 is generated as an intermediate step in generating the overall inner surface of the outer sleeve 14. Accordingly, from a control point of view it would be advantageous to generate the smooth transition portion 30 after the other surfaces of the inner sleeve 14 are generated or in combination with the last step of the process, such as the honing of the axially extending raceway surfaces 22 as before mentioned.

Obviously, the present invention is not limited to the specific details as herein described, but is capable of other modifications and changes without departing from the spirit and scope of the appended claims.

I claim:

1. An anti-friction ball bearing assembly comprising an outer sleeve and an inner sleeve concentrically fitting within said outer sleeve, said inner sleeve having a central opening for the passage of a shaft therethrough, the inner sleeve having a number of tracks defining paths for the circulation of balls between said sleeves and said shaft during relative movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways, said inner surface of the outer sleeve is further provided with a number of substantially concave raceway surfaces aligned with said tracks such that they provide a rolling bearing surface for said balls while said balls are in their loaded state, a smooth transition portion that presents no abrupt changes in direction for said balls contiguous with the ends of said raceway surfaces to enable said balls to smoothly begin or end said portion of their circulation path in which said balls are in contact with said shaft and raceway surfaces, said smooth transition being defined by a curve which is tangent to said raceway surfaces and blended with a recess provided on the inner surface of the outer sleeve at each end thereof.

* * * * *